United States Patent [19]
Harrison

[11] 4,213,474
[45] Jul. 22, 1980

[54] VEHICLE RADIATOR CLEANING AND TESTING SYSTEM

[76] Inventor: Frank Harrison, P. O. Box 1824, Kansas City, Mo. 64141

[21] Appl. No.: 63,428

[22] Filed: Aug. 3, 1979

[51] Int. Cl.³ .............................. B08B 9/00; B08B 3/00
[52] U.S. Cl. ..................................... 134/102; 134/106; 134/107; 134/169 A; 134/170; 34/104
[58] Field of Search .................. 134/102, 106-107, 134/166 R, 169 A, 170-171; 34/104; 239/137

[56] References Cited
U.S. PATENT DOCUMENTS

| | | | |
|---|---|---|---|
| 1,505,852 | 8/1924 | Boles | 134/102 X |
| 1,865,289 | 6/1932 | Trowbridge | 134/106 X |
| 1,908,955 | 5/1933 | Carmin | 134/102 |
| 2,170,730 | 8/1939 | Rodieck | 134/107 |
| 2,753,212 | 7/1956 | Aultman | 134/102 X |
| 3,910,498 | 10/1975 | Harrison | 239/137 |
| 4,158,262 | 6/1979 | Grasso | 34/104 X |

*Primary Examiner*—Robert L. Bleutge
*Attorney, Agent, or Firm*—Schmidt, Johnson, Hovey & Williams

[57] ABSTRACT

A unitary system for cleaning a vehicle radiator engine block and heater system in one quick operation without removal from the vehicle, or for cleaning and servicing the radiator after it has been removed from the vehicle, together with means for testing the radiator for leaks. The system includes a tank for receiving a radiator or heater core which has been removed from the vehicle for cleaning or repairing; a steam generator carried by the tank; a rack, also carried by the tank, and plumbing associated with said components whereby to deliver steam to the interior of a radiator within the tank and to direct steam and a cleaning solution, which has passed through the radiator, under pressure, upon the exterior of the radiator in the tank. The system also includes suitable fittings whereby a source of air under regulated pressure may be placed in communication with a radiator in the tank. The steam generator is provided with an independent outlet so that steam alone may be used to thaw a frozen cooling system. There is also provided a detergent cannister, carried by the tank and in communication with the steam generator for use in steam cleaning.

12 Claims, 7 Drawing Figures

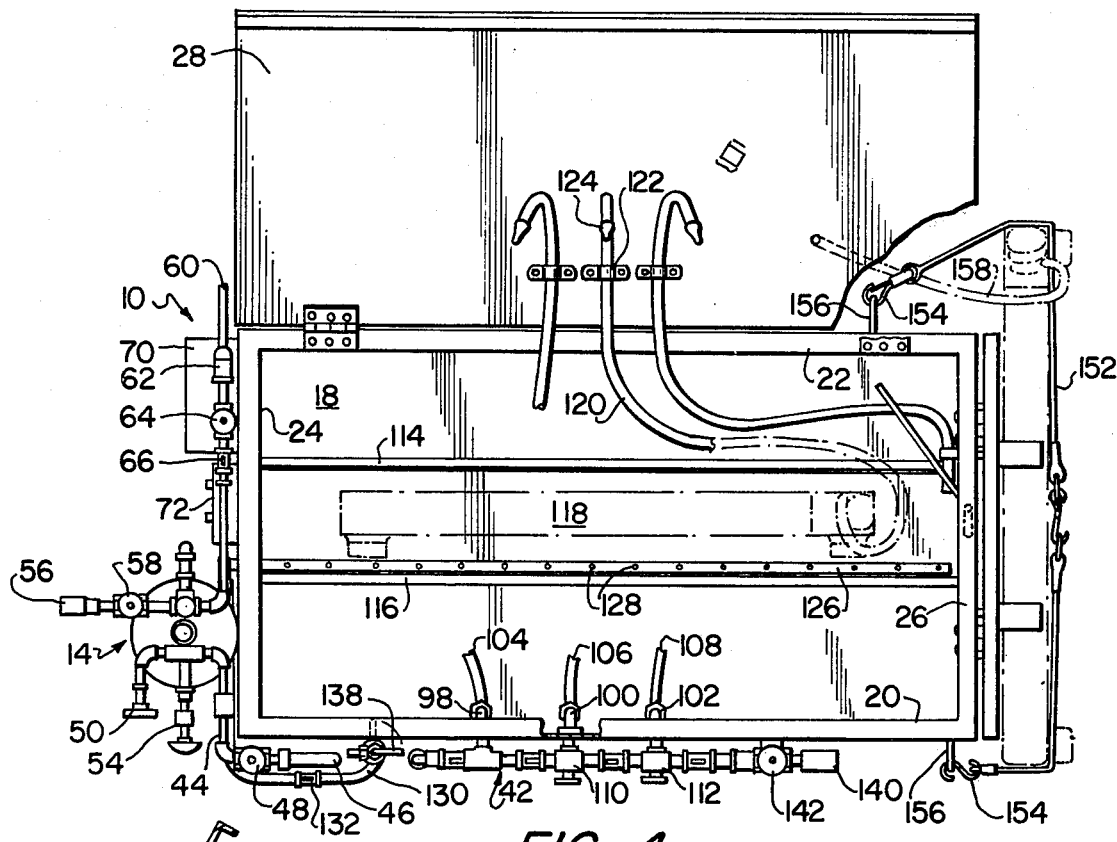
FIG. 4
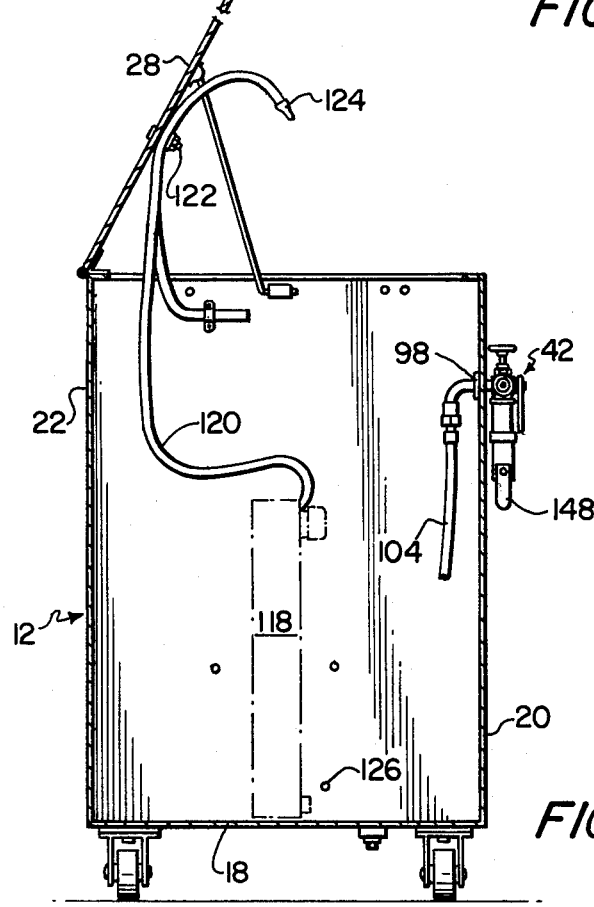
FIG. 5
FIG. 7
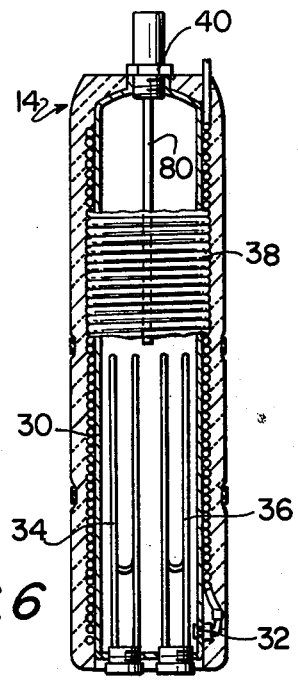
FIG. 6

VEHICLE RADIATOR CLEANING AND TESTING SYSTEM

BACKGROUND ART

It has long been the custom, in shops devoted to the cleaning and testing of vehicle radiators, to have several individual pieces of equipment such as for instance a boil-out vat; a testing tank; a dryer; and a flushing and paint booth, these individual components being independently but successively used and clean, test and repair a radiator for leaks; and to paint radiator, after repair thereof.

Applicant is the owner of U.S. Pat. No. 3,910,498, issued Oct. 7, 1975 and which teaches a steam generator of the type used, as a separate piece of equipment, for generating a source of steam to be used in connection with the cleaning and back flushing of automobile radiators, either on or off of the vehicle.

By the present invention, the entire system for cleaning and testing the radiator is presented as a unitary component in the form of a portable tank which carries a steam generator and a testing, repairing and painting rack, the tank also having associated tgerewith suitable fittings and couplings whereby steam or a mixture of steam and detergent may be utilized to clean a radiator on the vehicle.

Itf is important, however, that when a vehicle radiator is to be cleaned, tested, repaired and painted, only the single piece of equipment hereinafter disclosed is necessary to accomplished the entire operation and it is not necessary, as has hereinbefore been the case, to employ several different pieces of equipment for cleaning, testing, repairing and painting.

Manifestly, the space requirements for such equipment are considerably less than as has heretofore been the case, as is the expense of installation and operation of the equipment.

Thus, the unitary system hereinafter disclosed may be purchased and utilized as a single piece of equipment in a radiator shop and merely with electrical, water and air connections is ready to use in cleaning and testing radiators both on a vehicle and after a radiator has been removed from a vehicle. A significant advantage is the very short time, on the order of seven to ten minutes, required to have the system ready for use, as compared with previously known systems.

BRIEF DESCRIPTION OF DRAWINGS

In the drawings:

FIG. 4 is a top plan view, parts being in section and broken away, and showing the apparatus with the lid of the tank in an open condition;

FIG. 5 is a sectional view taken on line 5—5 of FIG. 1;

FIG. 6 is an enlarged sectional view taken centrally of the steam generator which forms a part of the system and is carried by the tank; and FIG. 7 is a perspective view of the heating element for the steam generator.

DETAILED DESCRIPTION

Figure 1:
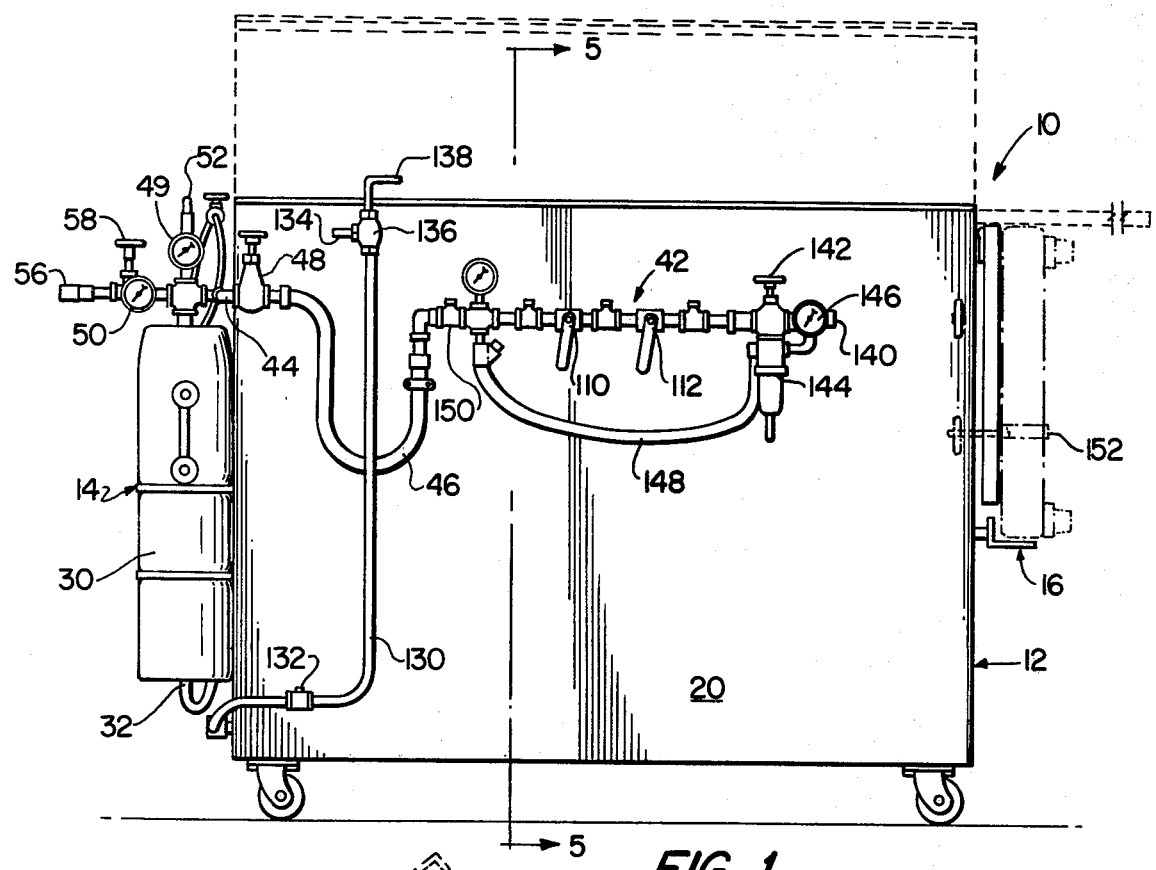
FIG. 1 is a front elevational view of the apparatus comprising the system for cleaning vehicle radiators.

The system hereinafter described comprises apparatus broadly designated by the numeral 10 and which includes, as its primary components, a wheeled tank 12 having a steam generator 14 carried thereby and a rack 16, also carried by the tank 12. The tank 12 is polygonal is configuration and includes a bottom 18, an upstanding front wall 20, back wall 22; and opposed end walls 24 and 26. A lid 28 is hingedly carried by the back wall 22 and can be swung from a position closing the top of the tank 12 to an open position, as illustrated for instance in FIG. 4 of the drawing.

The steam generator 14 is carried by the outer face of end wall 24 and is in the form of an insulated pressure cylinder 30, as best shown for instance in FIG. 6 of the drawing. Cylinder 30 is provided with a water inlet 32 adjacent the bottom wall thereof and receives therewithin a pair of heating elements 34 and 36, the configuration of one of said heating elements, such as 34 for instance, being shown in FIG. 7 of the drawing. A plurality of coils 38 surround the cylinder 30 and water is delivered to the upper end of said coils whereby the water may pass through coils 38 to be heated and thence into the cylinder 30, through inlet 32, all to the end that steam is generated, the steam being releasable from the cylinder 30 as by an outlet 40 which is at the top of the pressure cylinder 30.

A manifold 42 is carried by the exterior of the front wall 20 of tank 12 and is in communication with steam outlet 40 by means of suitable piping 44 which communicates with a tube 46, there being a valve 48 interposed between piping 44 and tube 46 for controlling the flow of steam from outlet 40 to the manifold 42.

The steam generator 14 is provided, at the uppermost end thereof, with a pressure gauge 49, a thermometer 50 and a safety valve 52. A water level sight tube 54 is carried by the sidewall pressure cylinder 30 in order to permit visual determination of the water level within the cylinder 30 of the steam generator 14.

The steam outlet 40 of cylinder 30 is also in communication with an independent outlet 56 which has a valve 58 interposed therewithin so that a steam hose may be coupled with said independent outlet 56 and delivery of steam thereto controlled by valve 58 for purposes which will be hereinafter described.

Water is delivered to the steam generator 14 by means of a suitable water line 60, which is in communication with a source of water at the site where the apparatus 10 is to be used, there being a coupling 62 so that the water line 60 may be quickly connected with the apparatus 10 to thereby deliver water to the steam generator 14. A valve 64 is provided in the piping extending from coupling 62 to the steam generator 14, as is a check valve 66 to prevent the back flow of steam. The water line, beyond the valve 64 extends along the exterior of the end wall 24 of tank 12 and enters the bottom portion of pressure cylinder 30 at water inlet 32, after passing through coils 38, whereby water is delivered to the lower portion of the pressure cylinder 30 of steam generator 14.

Suitable electrical controls, for the heating elements 34 and 36 are provided, there being an electrical inlet line 68 for the apparatus 10, which electrical inlet line is suitably coupled with a control box 70, carrying appropriate relays and sensing mechanisms, the control box 70 in turn being coupled with switch box 72 by an electrical line 74, there being a switch for controlling electrical power to each of elements 34 and 36, respectively, through an electrical line 76, which leads from the switch box 72 to corresponding elements 34 and 36. Switch box 72 is also coupled with the upper end of pressure cylinder 30 through electrical lines 78 which are connected with a sensor 80 disposed within the interior of cylinder 30 so that the water level may be sensed within the cylinder 30 and, if it is depleted below a certain level, the switches 72 are thrown whereby to cut off the electric power to the elements 34 and 36.

Figure 2:
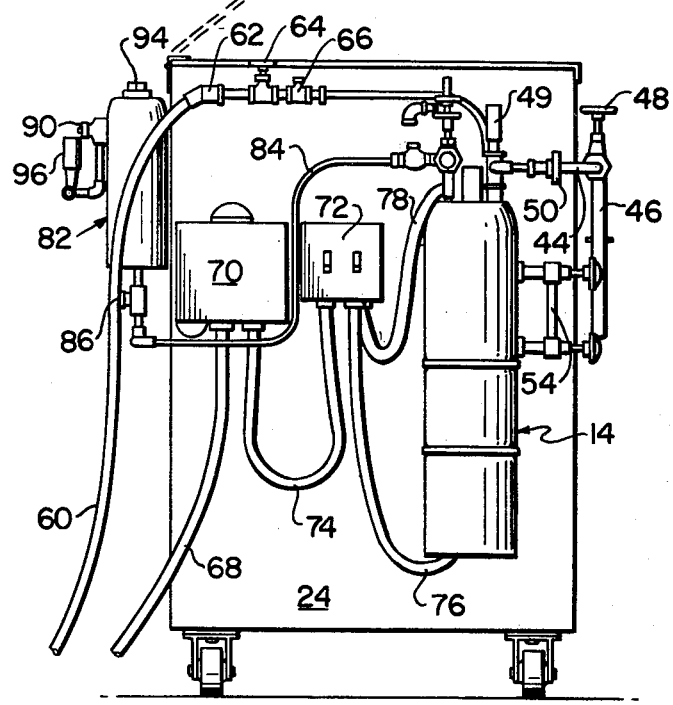
FIG. 2 is an elevational view of one end of the apparatus.
Figure 3:
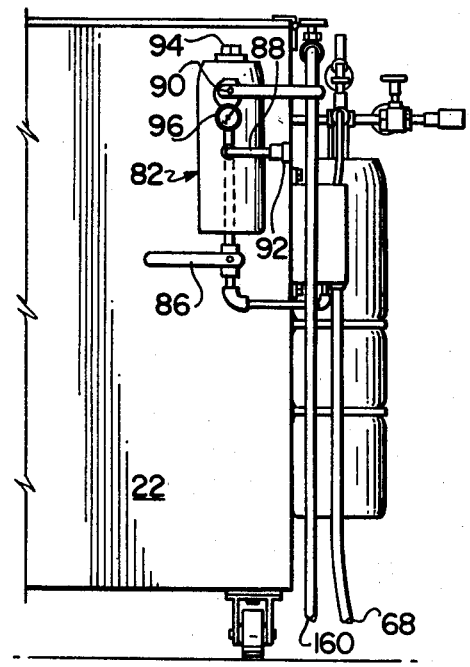
FIG. 3 is a fragmentary rear elevational view of the apparatus.

The tank 12 also carries, preferably on the exterior of back wall 22 thereof, a detergent cannister 82. As shown in FIG. 2, there is a line leading from the outlet 40 of steam generator 14 to the bottom of the cannister 82, the said line 84 placing outlet 40 in communication with the bottom of the cannister 82, there being a valve 86 interposed in said line for selectively permitting the flow of steam into the interior of cannister 82. The cannister 82 is adapted to receive therewithin a charge of suitable detergent or other appropriate radiator cleaning composition, which may be in liquid, granular or solid form, whereby the steam entering the cannister 82 from the bottom thereof will mix with the detergent and the mixture of steam and detergent may exit cannister 82 through an outlet line 88 controlled by a valve 90, the line 88 having a quick disconnect fitting 92 thereon so that a suitable hose may be coupled with line 88, through coupling 92 and the hose used, at a remote location from apparatus 10 as for instance to clean a radiator which is in place upon a vehicle with the mixture of detergent and steam emanating from the cannister 82 after steam has been run therethrough to mix with the detergent placed therein. A filling cap 94 is provided for cannister 82 in order to readily permit the filling thereof with a suitable detergent and a pressure gauge 96 is carried exteriorly of the cannister 82.

The manifold 42 which is carried on the exterior of front wall 20 of tank 12, as illustrated for instance in FIGS. 1 and 4, is adapted to deliver steam to one or more radiators which have been removed from a vehicle or vehicles and which have been placed within the interior of the tank 12 for purposes of cleaning the radiator. To this end, the manifold 42 is provided with three outlets, 98, 100 and 102, each of said outlets being coupled with a corresponding tube 104, 106 and 108, respectively. As is apparent from FIGS. 1 and 4, the outlets 98–102 of the manifold 42 are individually controllable whereby steam may be permitted to egress from only one of said outlets, two of the outlets, or all three outlets if in fact there are three radiators in the tank being cleaned simultaneously.

Thus, the first outlet 98 would effectively be controlled by valve 48 whereby steam would be permitted to pass from outlet 40, through piping 44, tube 46 into the manifold 42 and thence outlet 98 through tube 104.

If additional radiators beyond one are to be cleaned within the tank simultaneously, the second outlet 100 may be opened by means of valve 110 and, if a third radiator is to be placed within the tank 12, the third outlet 102 may be opened by means of a valve 112.

When the apparatus of the system is in operation, one or more radiators may be removed from a vehicle and placed within the tank 12 whereby to clean the same in a manner which will hereinafter be described. It is to be noted that the tank 12 is provided with vertical interior partitions 114 and 116 whereby to define three areas of the interior of the tank 12 within which a radiator may be placed in a vertical position.

Thus, for example and within the context, for purposes of this description, of cleaning of a single radiator, as illustrated in the drawings, the radiator, broadly designated as 118 would initially be removed from the vehicle and cleaned exteriorly as by spraying the same with air or steam. The conventional pressure cap having a rating of 4–7 pounds pressure would be left on and the hose connections would be suitably capped. An appropriate cleaning composition would, prior to the capping of the hose connection, be placed within the interior of radiator 118.

The radiator 118 would then be placed within the tank 12, as between the two partitions 114 and 116 as illustrated, the radiator being in a vertical position, as if it were still upon the vehicle.

Once positioned within the tank 12, the tube 104 would be placed into communication with the drain plug of the radiator, which would normally be at the lowermost portion of the radiator, as positioned within the tank, whereby steam would be delivered through the manifold 42, outlet 98 and tube 104 into the interior of the radiator.

The overflow outlet of the radiator, which would normally be positioned adjacent the top of the radiator, as the radiator was situated within the tank 12, is placed into communication with a hose, such as 120, which hose traverses the interior of the tank 12 and is positioned to direct steam upon the exterior of the radiator.

For instance, and as illustrated in FIGS. 4 and 5, the hose 120, being used when a single radiator is being cleaned, would be carried by the lid 28 of the tank 12 to a suitable bracket 122, the free end of the hose 120 being provided with a nozzle 124 whereby steam passing through the radiator 118 and the hose 120 would be directed upon the exterior of the radiator to further clean said exterior with the steam and cleaning composition which has passed from the radiator 118.

Thus, steam is delivered to the interior of the radiator through tube 104, passes completely through the interior of the radiator 118 and exits through the overflow outlet, which is in communication with hose 120, the steam and cleaning composition passing through nozzle 124 and thence being directed upon the exterior of the radiator being cleaned As is apparent from the foregoing description, a certain amount of hot water and cleaning solution will be accumulated within the bottom portion of the tank 12 during a cleaning operation upon a radiator. To take advantage of this collection of hot water and cleaning solution, there is provided a perforated pipe 126 which spans the bottom of the tank 12, as shown in FIG. 4 for instance, the pipe 126 having a plurality of perforations 128 therein whereby to agitate the hot liquid which accumulates within the tank 12 during a cleaning operation.

To accomplish such agitation, there is provided, in communication with the pipe 126 an air line 130, shown in FIG. 1, having a check valve 132 and which is provided, adjacent the top edge of the tank, with an air inlet fitting 134. The fitting 132 is intended to receive a quick connect coupling from a source of air under pressure and the flow of air through line 130 is controlled by a suitable valve 136, operable by a handle 138. It is notable that the handle 138 is of such a construction that it cannot be swung to open valve 136 and permit flow of air to line 130 until such time as lid 28 of the tank is closed, this functioning as a safety feature, so that agitation of the hot solution within the tank cannot occur when the lid 28 is open. Thus, when it is desired to open lid 28, handle 138 must be swung to a position closing the valve 136 and terminating the flow of air through line 130 and thus pipe 126.

As hereinabove referred to, it is desirable to have an independent source of air under pressure closely associated with the apparatus 10 and it will be appreciated that such source of air could take the form of an air compressor (not shown) actually carried by the tank 12. However, since air is readily available in most shops which would normally utilize the apparatus 10, such apparatus has been described herein as being adapted to receive air under pressure from a suitable source, such as a compressor which could be fitted with suitable hoses to deliver air to the apparatus 10.

Given a source of air under pressure, it is also to be noted that the manifold 42, carries, at the end thereof opposite to that which is in communication with tube 46, an air inlet 140, controlled by an air valve 142 and having in communication therewith an air regulator 144, including an air pressure gauge 146. Thus, when air is delivered, from the exterior source to the air inlet 140, it passes, upon the opening thereof, through valve 142 and regulator 144 along an air line 148 to a point adjacent the main inlet to manifold 42. In this regard, a check valve 150 is positioned downstream from the point of communication of air line 148 with the manifold 42, to prevent escape of air into the steam generator.

It will be appreciated that, by opening valve 142, after an air line has been coupled at 140, air may be selectively delivered through the outlets 98-102 of the manifold 42. This is a desirable feature inasmuch as it has been found to be extremely helpful to the cleaning of a radiator, such as 118, to permit air under pressure to pass therethrough, either at the same time the steam is being delivered to the interior of the radiator or independently of the steam being delivered to the radiator, the air serving to loosen any scale which may have accumulated in the interior of the radiator.

Thus, while the radiator 118 is being cleaned in the manner hereinabove described, air may be selectively delivered, either independently or together with the steam, to the interior of the radiator 118 to aid in the cleaning thereof.

Once a radiator such as 118 has been cleaned by the method hereinabove described, the tank lid 28 is opened, it being again noted that it is necessary to close valve 136 prior to opening the tank lid, and the radiator is disconnected from its tube 104 and hose 120 whereby to free the same for removal from the interior of the tank.

Once the radiator has been removed, it may be positioned upon rack 16, as illustrated in FIGS. 1 and 4 for instance, and held upon such rack by a resilient band or bands such as 152, which bands have suitable hooks thereon such as 154 to thereby secure the opposite ends thereof to eyes such as 156 which are carried exteriorly of the tank 12 on walls such as 20 and 22 thereof. Thus, the radiator may be readily placed in a vertical position on the rack 16 adjacent the end wall 26 of the tank 12.

Once the radiator has been so positioned a steam line may be coupled with independent outlet 56 and the steam flowing through said line, upon opening of valve 58, utilized to spray the radiator to give the same in final cleaning.

If it is then desired to test the radiator for leaks, the usual opening is capped, preferably with a cap having a 15-18 pound pressure rating, as are the hose connection openings, and the steam line which has been coupled with independent outlet 56 is placed into communication with the drain plug of the radiator as it is being tested. The overflow tube of the radiator being tested is placed in communication with the interior of the tank 12 and through a drain line 158, shown in FIG. 4. The drain line 158 permits liquid flowing therethrough to flow back into the tank 12 once the lid of the tank has been closed.

Thus, and in order to test the radiator while it is upon rack 16, steam under pressure is delivered to the interior of the radiator, through the drain plug and the steam, and/or liquid, after it has passed through the radiator exits through drain line 158 and back into the tank 12. If this testing locates leaks in the radiator these may be marked with chalk and soldered to seal the same, it being noted that soldering will be facilitated since the radiator is in a heated condition. The use of steam pressure in testing will readily disclose any leaks due to the expansion of the metal when it is heated.

After repair of any leaks in the radiator, and while the radiator is still upon the rack 16, it may be painted, while it is hot, this condition permitting the paint to more readily adhere to the exterior of the radiator upon the rack 16. It should be noted that rack 16 can be turned to reverse the exposed side of the radiator while it is thereupon and thus permit complete painting of the radiator or repair leaks located in the radiator.

Thus, there is presented, in a single piece of apparatus, a unitary system for cleaning, testing, repairing and painting a vehicle radiator once it has been removed from the vehicle. By the same token, the single piece of apparatus provides for the generation of steam or a steam and detergent mixture which can be utilized to clean a radiator engine block and heater system while it remains in the vehicle.

Having thus described the invention, what is claimed and desired to be secured by Letters Patent is:

1. A unitary system for cleaning vehicle radiators comprising:
   a tank for receiving the radiator to be cleaned;
   a steam generator associated with said tank;
   means placing the steam generator into communication with the interior of the radiator to be cleaned whereby to direct steam through the interior of the radiator; and
   means for directing the steam which has passed through the interior of the radiator upon the exterior of the radiator in the tank.

2. A unitary system for cleaning vehicle radiators as set forth in claim 1, there being a source of air under pressure and associated with the tank; and means for placing said air source in communication with the interior of the radiator when the radiator is in the tank.

3. A unitary system for cleaning vehicle radiators as set forth in claim 2, there being a perforated pipe adjacent the bottom of said tank and means for placing said pipe in communication with said source of air under pressure whereby to agitate any liquid within the tank during cleaning of a radiator in the tank.

4. A unitary system for cleaning vehicle radiators as set forth in claim 1, wherein said steam generator has an independent outlet adapted to be coupled with a hose to permit steam cleaning a radiator outside of the tank.

5. A unitary system for cleaning vehicle radiators as set forth in claim 4, there being a rack carried by the tank for receiving the radiator after it has been cleaned in the tank and removed therefrom, the rack being within reach of the hose coupled to said independent outlet to permit final cleaning and testing of the radiator with steam.

6. A unitary system for cleaning vehicle radiators as set forth in claim 1, there being a detergent receiving cannister carried by the tank and in communication with said steam generator for mixing steam with the detergent; and means for coupling a hose with said cannister to permit cleaning of a radiator outside of the tank with the mixture of steam and detergent.

7. A unitary system for cleaning vehicle radiators as set forth in claim 1, said steam generator being in the form of a pressure cylinder mounted on the tank; a water source for delivering water into an inlet at the bottom of said cylinder; at least one heating element in the cylinder; a plurality of coils outside the cylinder, surrounding said cylinder, and in communication with said water source and said inlet; and a steam outlet at the top of said cylinder.

8. A unitary system for cleaning vehicle radiators as set forth in claim 7, said means for placing the steam generator in communication with the interior of the radiator including a manifold carried by the tank, said manifold being in communication with said steam outlet; and at least one tube in communication with the manifold and adapted to be placed in communication with the interior of a radiator in the tank whereby to deliver steam from the generator to the interior of the radiator.

9. A unitary system for cleaning vehicle radiators as set forth in claim 8, said means for directing steam which has passed through the interior of the radiator upon the exterior of the radiator including at least one hose having an inlet in communication with the interior of the radiator and carried by the tank in a position to direct said steam upon the exterior of the radiator.

10. A unitary system for cleaning vehicle radiators as set forth in claim 9, said hose being in communication with the interior of the radiator by being coupled with the overflow outlet of the radiator.

11. A unitary system for cleaning vehicle radiators as set forth in claim 10, there being a lid for said tank, said hose having an outlet positioned on the inside of the lid of the tank and in generally overlying relationship to a radiator in the tank.

12. A unitary system for cleaning vehicle radiators as set forth in claim 8, said tube being in communication with the interior of the radiator by being coupled with the drain plug of the radiator.

* * * * *